United States Patent
Yoshino

(10) Patent No.: US 11,895,448 B2
(45) Date of Patent: Feb. 6, 2024

(54) COMMUNICATION APPARATUS AND COMMUNICATION METHOD

(71) Applicant: NIPPON TELEGRAPH AND TELEPHONE CORPORATION, Tokyo (JP)

(72) Inventor: Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 191 days.

(21) Appl. No.: 17/626,036

(22) PCT Filed: Jul. 16, 2019

(86) PCT No.: PCT/JP2019/027953
§ 371 (c)(1),
(2) Date: Jan. 10, 2022

(87) PCT Pub. No.: WO2021/009853
PCT Pub. Date: Jan. 21, 2021

(65) Prior Publication Data
US 2022/0377440 A1 Nov. 24, 2022

(51) Int. Cl.
*G06F 15/16* (2006.01)
*H04Q 11/00* (2006.01)
(Continued)

(52) U.S. Cl.
CPC ...... *H04Q 11/0067* (2013.01); *H04J 14/0282* (2013.01); *H04L 12/44* (2013.01); *H04L 12/46* (2013.01)

(58) Field of Classification Search
CPC ..... H04L 12/44; H04L 12/46; H04Q 11/0067; H04J 14/0282
(Continued)

(56) References Cited

U.S. PATENT DOCUMENTS 7,421,206 B2 * 9/2008 Lee ............... H04J 14/0282
398/83
8,538,259 B2 * 9/2013 Kai ............... H04J 14/0226
398/48

(Continued)

OTHER PUBLICATIONS

Masashi Tadokoro et al., "A Study of Cascaded PON with 10G-EPON Systems", 2014 Institute of Electronics, Information and Communication Engineers Society Conference, Sep. 23, 2014.

*Primary Examiner* — Moustafa M Meky
(74) *Attorney, Agent, or Firm* — Harness, Dickey & Pierce, P.L.C.

(57) ABSTRACT

One aspect of the present invention is a communication device including: a first control unit that converts, when data including partial data obtained by fragmenting a user frame and a user frame is received via a passive optical network, the partial data into data that is not discarded in a transmission line through which the user frame is transmitted, and transmits the data through the transmission line through which the user frame is transmitted; and a second control unit that receives the data via the transmission line through which the user frame is transmitted from the first control unit, converts the received data into a user frame that is transmittable through the passive optical network, and transmits the user frame via the passive optical network.

7 Claims, 11 Drawing Sheets

(51) Int. Cl.
  *H04J 14/02*  (2006.01)
  *H04L 12/44*  (2006.01)
  *H04L 12/46*  (2006.01)

(58) Field of Classification Search
  USPC ......................................................... 709/224
  See application file for complete search history.

(56) References Cited

U.S. PATENT DOCUMENTS

| | | | | |
|---|---|---|---|---|
| 8,543,001 | B2* | 9/2013 | Cheng | H04B 10/2587 |
| | | | | 396/70 |
| 8,548,323 | B2* | 10/2013 | Hirth | H04B 10/272 |
| | | | | 398/43 |
| 8,582,970 | B2* | 11/2013 | Yamashita | H04J 3/0682 |
| | | | | 398/72 |
| 9,294,215 | B2* | 3/2016 | Grobe | H04J 14/0275 |
| 9,350,480 | B2* | 5/2016 | Yamashita | H04B 10/0775 |
| 9,503,212 | B2* | 11/2016 | Sugawa | H04J 14/0282 |
| 9,806,845 | B1* | 10/2017 | Bernard | H04J 14/0282 |
| 10,397,674 | B2* | 8/2019 | Detwiler | H04J 14/0256 |
| 10,749,623 | B2* | 8/2020 | Detwiler | H04J 14/0265 |
| 11,240,165 | B2* | 2/2022 | Hamzeh | H04W 76/16 |
| 11,329,749 | B2* | 5/2022 | Uzawa | H04W 72/0453 |

* cited by examiner

COMMUNICATION APPARATUS AND COMMUNICATION METHOD

CROSS-REFERENCE TO RELATED APPLICATIONS

This application is a 371 U.S. National Phase of International Application No. PCT/JP2019/027953 filed on Jul. 16, 2019. The entire disclosure of the above application is incorporated herein by reference.

TECHNICAL FIELD

The present invention relates to a communication device and a communication method.

BACKGROUND ART

In services that provide optical access, economical service provision is realized by using a passive optical network (PON) in which a line terminal and a plurality of network units are connected. A PON is a point-to-multipoint network in which a station provides services to a large number of subscribers. For example, in the PON, downlink optical signals from the station are branched by an optical coupler which is coupled to one trunk fiber, and distributed to a plurality of subscribers. Further, uplink optical signals from the subscribers are combined by multiplexing.

In recent years, a technology of cascaded PON has been proposed (see NPL 1, for example). In a cascaded PON, a PON on the higher level and a PON on the lower level are connected. A section composed of ONUs (optical network units) in the higher level-PON and an OLT (optical line terminal) in the lower-level PON is referred to as an inter-PON bridge.

CITATION LIST

Non Patent Literature

[NPL 1] Masashi Tadokoro, et al. "A Study of Cascaded PON with 10G-EPON Systems", 2014 Society Conference B-8-47

SUMMARY OF THE INVENTION

Technical Problem

In a cascaded PON with PONS using ITU-T system standards such as G-PON, XS-PON, XPGS-PON, and NG-PON2, there is an issue of transmission of user data over an inter-PON bridge.

The reason is as follows. Now assume that user data is a frame in Ethernet (registered trademarks in the following description and drawings) format, and the user data with the frame in Ethernet format is transmitted over an inter-PON bridge. In the above-mentioned standards, user data in different formats such as Ethernet, POTS (Plain Old Telephone Service), and ATM (Asynchronous Transfer Mode) is contained in a variable-length frame called GEM (G-PON encapsulation method), which is based on the general-purpose frame defined by ITU-T G.7041/Y.1303, and such a GEM frame and an ATM cell are collectively encapsulated in a fixed-length frame with a 125 microsecond cycle, called a GTC (G-PON transmission convergence) frame. An upstream GTC frame from an ONU to an OPT includes multiple upstream bursts from one or more ONUs.

FIG. 10 illustrates the overhead of the physical layer and the GTC layer related to an upstream burst. Each burst begins with a PLOu (upstream physical layer overhead) section, which is composed of a preamble, delimiter, and 3-byte burst header, followed by one or more Allocation Intervals, each of which is composed of a set of GTC overhead and GTC payload. The PLOu overhead and the burst mode overhead, which are different from each other, partially overlap. Unlike the PLOu, which refers to a field transmitted by an ONU, the burst mode overhead includes a guard time for burst separation. The burst mode overhead is followed by a burst header and one or more sets of GTC overhead and GTC payload.

FIG. 11 illustrates an example of encapsulating an Ethernet (both registered trademarks in the following description and drawings) frame in a GEM frame. Here, the 5-byte overhead of the GEM frame is composed of PLT (Payload Length Indicator), Port-ID (Port Identifier), PTI (Payload Type Indicator), and CRC (Cyclic Redundancy Check). The Ethernet frame is transmitted directly in the GEM frame payload. The Ethernet preamble and SFD (start frame delimiter) are discarded prior to GEM encapsulation. Each Ethernet frame is encapsulated in one or more GEM frames. A header is added to the beginning of each fragment of each user data frame. The PTI indicates which fragment contains the end of the user data frame.

In this way, in order to transmit an encapsulated frame using a standard frame such as a GTC frame over a PON section, a part of the user frame, for example, an Ethernet frame is fragmented. The fragmented Ethernet frames are combined at the transmission destination end. Therefore, there is a problem that a fragmented user's Ethernet frame cannot be transmitted through the Ethernet transmission line in an inter-PON bridge as it is.

In view of the above circumstances, an object of the present invention is to provide a technique for efficient transmission of user frames in a PON system, even if in a cascaded PON, in which a part of a user frame (e.g., Ethernet frame) such as G-PON is fragmented to be transmitted as a frame.

Means for Solving the Problem

One aspect of the present invention is a communication device including: a first control unit that converts, when data including partial data obtained by fragmenting a user frame and a user frame is received via a passive optical network, the partial data into data that is not discarded in a transmission line through which the user frame is transmitted, and transmits the data through the transmission line through which the user frame is transmitted; and a second control unit that receives the data via the transmission line through which the user frame is transmitted from the first control unit, converts the received data into a user frame that is transmittable through the passive optical network, and transmits the user frame via the passive optical network.

One aspect of the present invention is the communication device, wherein the first control unit restores the user frame by combining a plurality of pieces of the partial data to convert the partial data into data that is not discarded in the transmission line through which the user frame is transmitted.

One aspect of the present invention is the communication device, wherein the first control unit buffers the user frame transmitted together with the partial data and the partial data until other partial data to be combined with the partial data is received.

One aspect of the present invention is the communication device, wherein the first control unit buffers the partial data until other partial data to be combined with the partial data is received, and transmits the user frame through the transmission line through which the user frame is transmitted, without buffering the user frame.

One aspect of the present invention is the communication device, wherein the first control unit performs, for data including the partial data, either supplement processing of adding data in a head part or data in an end part to be originally included in a user frame or rewriting of data in the head part or data in the end part, to convert the partial data into data that is not discarded in the transmission line through which the user frame is transmitted. Note that the data thus generated, which is not discarded in the transmission line through which the user frame is transmitted, has a different structure from the original user frame (e.g., Ethernet frame).

One aspect of the present invention is the communication device, wherein the second control unit receives the data subjected to the supplement processing and generates the user frame by combining a plurality of pieces of the partial data after either deleting the data in the head part or the data in the end part added in the supplement processing or writing back the data in the head part and the data in the end part rewritten in the supplement processing.

One aspect of the present invention is a communication method including: a first control step of converting, when data including partial data obtained by fragmenting a user frame and a user frame is received via a passive optical network, the partial data into data that is not discarded in a transmission line through which the user frame is transmitted, and transmitting data through the transmission line through which the user frame is transmitted; and a second control step of receiving the data via the transmission line through which the user frame is transmitted, converting the received data into a user frame that is transmittable through the passive optical network, and transmitting the user frame via the passive optical network.

Effects of the Invention

According to the present invention, it is possible to provide efficient transmission of user frames in a PON system, even if in a cascaded PON, in which a part of a user frame (e.g., Ethernet frame) such as G-PON is fragmented to be transmitted as a frame.

DESCRIPTION OF EMBODIMENTS

Embodiments of the present invention will be described in detail with reference to the drawings.

(System Configuration)

An embodiment of the present invention will be described below with reference to the drawings.

Figure 1:
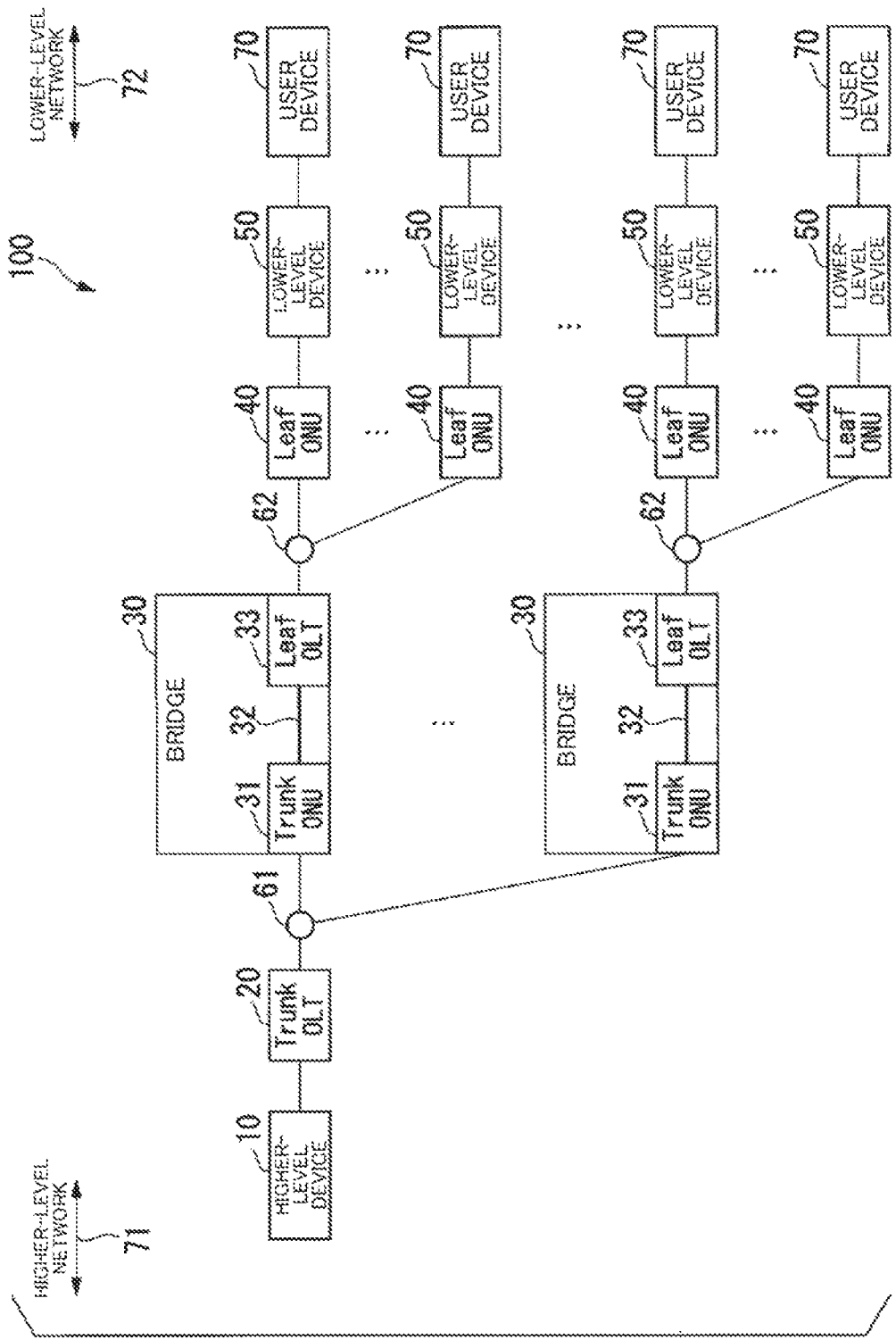
FIG. 1 is a diagram illustrating a system configuration example of a communication system 100 according to an embodiment.

FIG. 1 is a diagram illustrating a system configuration example of a communication system 100 according to the embodiment. A cascaded PON is deployed in the communication system 100.

The communication system 100 includes a set of a higher-level device 10, a Trunk OLT 20, a plurality of bridges 30, and one or more Leaf ONUs 40 and lower-level devices 50. The higher-level device 10 is connected to a higher-level network 71 corresponding to a higher-level network of the communication system 100. The Trunk OLT 20 is an example of a line terminal installed on the higher level. The higher-level device 10 and the Trunk OLT 20 are connected in a one-to-one, one-to-many, many-to-one, or many-to-many relationship. The Trunk OLT 20 and the one or more bridges 30 are communicably connected to each other via branched communication lines. Each bridge 30 is communicably connected to the one or more Leaf ONUs 40 via branched communication lines. The Leaf ONUs 40 are communicably connected to the respective lower-level devices 50. Each lower-level device 50 is communicably connected to one or more user devices 70 via a lower-level network 72.

The higher-level device 10 is communicably connected to the plurality of lower-level devices 50 via the Trunk OLT 20, the bridge(s) 30, and the plurality of Leaf ONUS 40. A relay unit 61 is provided in a communication network between the Trunk OLT 20 and the bridge(s) 30. The relay unit 61 is a device that splits light. The relay unit 61 is, for example, an optical splitter. The relay unit 61 may be a multiplexing device that multiplexes or demultiplexes optical signals. The communication network between the Trunk OLT 20 and the Leaf ONU(s) 40 is configured using a PON such as a G-PON that fragments a part of a user frame (e.g., an Ethernet frame) and transmits the data as a frame.

The higher-level device 10 is a device that communicates with the plurality of lower-level devices 50 to implement a predetermined function. The higher-level device 10 is, for example, a base band unit (BBU) in a mobile network. The higher-level device 10 may be, for example, a relay network.

The lower-level device 50 is a device that communicates with the higher-level device 10 to implement a predetermined function. The lower-level device 50 is a device installed at a position closer to the user side than the higher-level device 10. For example, in a case where the higher-level device 10 is a BBU, the lower-level device 50 is a remote radio head (RRH) in a mobile network. In this case, the lower-level network 72 is an access section of the mobile network. On the other hand, in a case where the higher-level device 10 is a relay network, the lower-level device 50 may be a set-top box. In this case, the lower-level network 72 is a network such as a home network. The lower-level device 50 accommodates, for example, one or more user devices 70. Note that the user device(s) 70 may be connected to the corresponding Leaf ONU(s) 40 without going through the lower-level device(s) 50.

The user device 70 is a device that is communicably connected to another device via the higher-level network 71 by connecting to the lower-level device 50 via the lower-level network 72. The user device 70 is an information processing device such as a smartphone, a tablet, or a personal computer. The user device 70 may be, for example, a sensor in IoT (Internet of Things). The user device 70 may be a device for business use such as an ATM (Automatic Teller Machine), a vending machine, or a POS (Point Of Sale) terminal.

Figure 2:
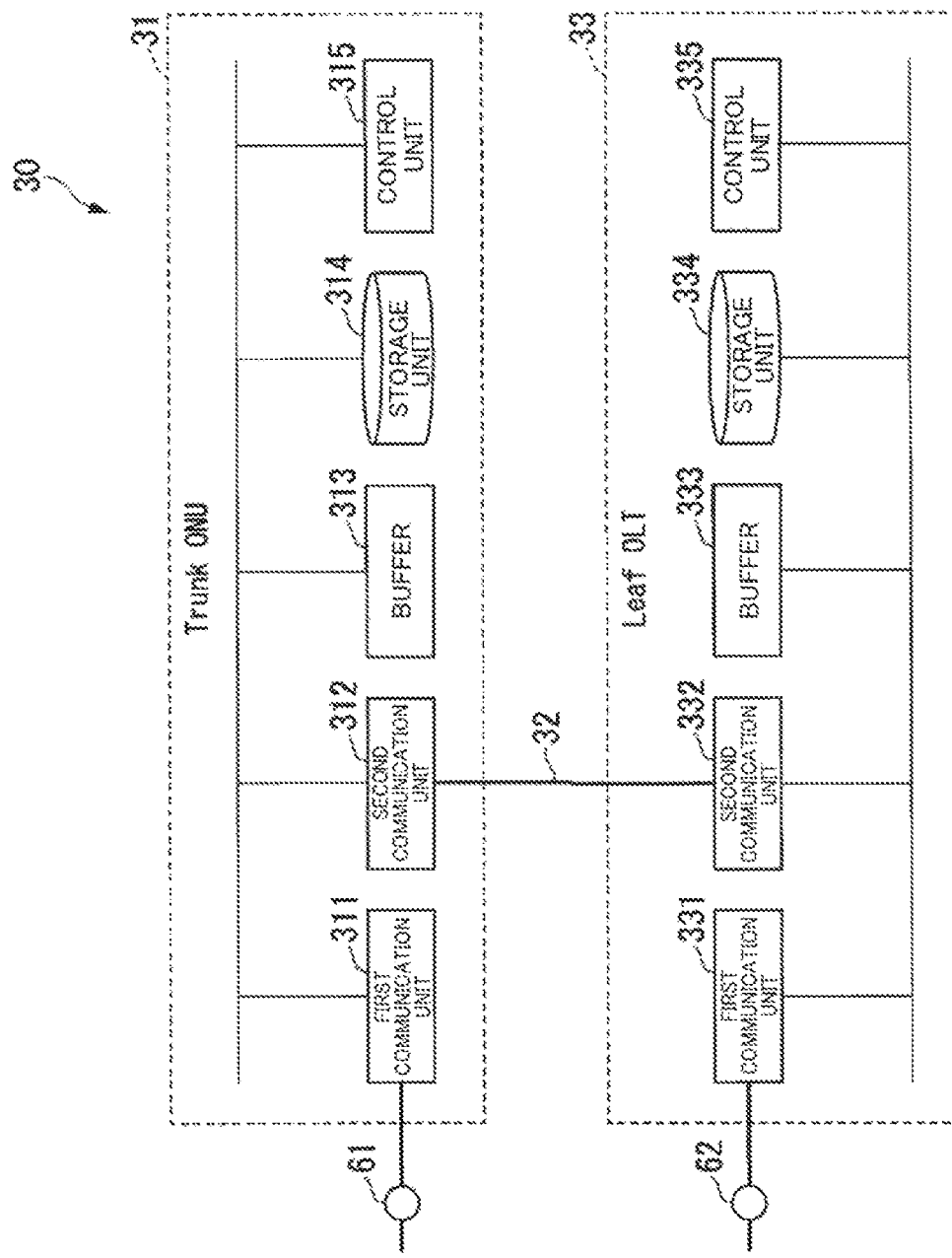
FIG. 2 is a diagram illustrating a specific example of a hardware block diagram of a bridge 30.

FIG. 2 is a diagram illustrating a specific example of a hardware block diagram of the bridge 30. The bridge 30 includes a Trunk ONU 31, an Ethernet transmission line 32, and a Leaf OLT 33. The Trunk ONU 31 includes a first communication unit 311, a second communication unit 312, a buffer 313, a storage unit 314, and a control unit 315. The first communication unit 311 is configured using a communication interface. The first communication unit 311 communicates with the Trunk OLT 20 via an optical transmission line and the relay unit 61. The second communication unit 312 is configured using a communication interface. The second communication unit 312 communicates with the Leaf OLT 33 via the Ethernet transmission line 32.

The buffer 313 is configured using a storage device such as a semiconductor storage device. The buffer 313 temporarily stores a part or all of communication data relayed by the Trunk ONU 31.

The storage unit 314 is configured using a storage device (non-transitory recording medium) such as a magnetic hard disk device or a semiconductor storage device. The storage unit 314 stores data such as a program required for the operation of the control unit 315.

The control unit 315 is configured using, for example, a processor such as a CPU (Central Processing Unit). The control unit 315 operates by a program stored in the storage unit 314 being read and executed. The program may be recorded on a computer-readable recording medium. The computer-readable recording medium is a non-transitory storage medium, including a portable medium, such as a flexible disk, magneto optical disk, ROM (Read Only Memory), and CD-ROM (Compact Disc Read Only Memory), and a storage device, such as a hard disk built in a computer system, for example. The program may be transmitted via a telecommunication line.

A part or all of the operation of the control unit 315 may be implemented using hardware including, for example, an electronic circuit or circuitry using an LSI (Large Scale Integration circuit), ASIC (Application Specific Integrated Circuit), PLD (Programmable Logic Integrated Device), or FPGA (Field Programmable Gate Array).

The bridge 30 may be not integrated with the Trunk ONU 31 and the leaf OLT 33 so that they are separately arranged. In that case, the defragmentation described later is performed on the output side of each of the Trunk ONU 31 and the leaf OLT 33 toward the Ethernet transmission line 32. Further, when a part other than the user frame is added or a part of the user frame is changed in defragmentation, the Trunk ONU 31 and the leaf OLT 33 can have, in addition to the normal defragmentation processing, functions of deleting a part added at the input side from the Ethernet transmission line 32 and restoring the changes in a part of the user frame.

Three specific examples of the flow of operation of the communication system 100 will be described below. Hereinafter, the examples are described with only the uplink from Leaf to Trunk. However, the same applies to the downlink from Trunk to Leaf, and they may be implemented for one of uplink and downlink, or may be implemented for both uplink and downlink.

A user frame as used herein refers to an Ethernet frame, but the same applies to other types of user frames to be transmitted using, for example, a GTC frame.

Figure 3:
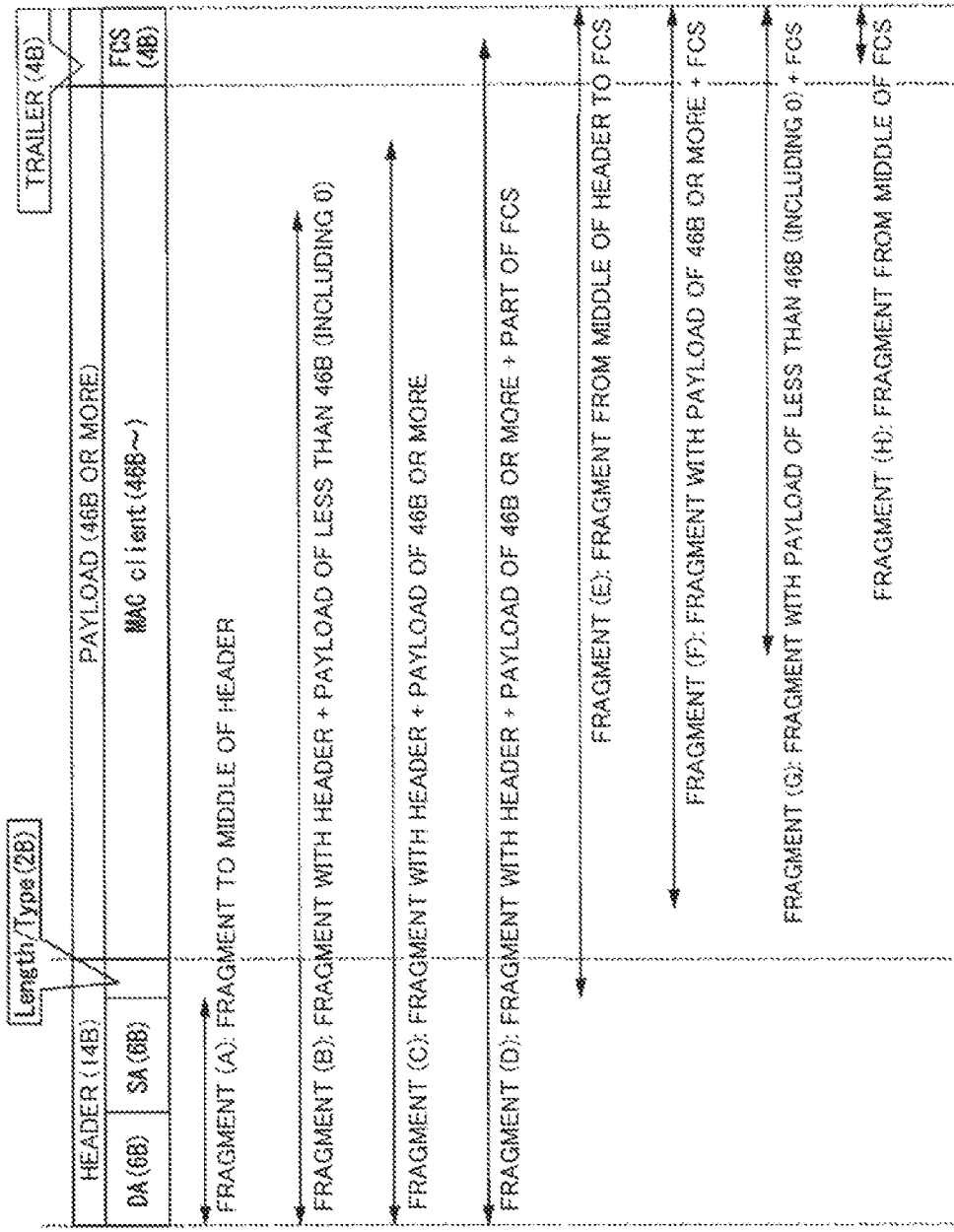
FIG. 3 illustrates an example of two division fragmentation of an Ethernet frame.

An example of two division fragmentation of an Ethernet frame is illustrated in FIG. 3. Here, the Ethernet frame is illustrated in the IEEE 802.3 frame format, but the same applies to other formats. The Ethernet frame is composed of a header of 14 bytes, a payload of 46 bytes or more, and a trailer of 4 bytes which is FCS (Frame Check Sequence). The header of 14 bytes is composed of DA (Destination Address) of 6 bytes, SA (Source Address) of 6 bytes, and Length/Type of 2 bytes. The fragments are categorized into eight types of: (A) from the beginning to the middle of the header; (B) from the beginning to the payload of less than 46 bytes including 0 bytes; (C) from the beginning to the payload of 46 bytes or more; (D) from the beginning to the middle of the trailer; (E) from the middle of the header to the end; (F) from the payload of 46 bytes or more to the end; (C) from the payload of less than 46 bytes including 0 to the end; and (H) from the middle of the trailer to the end. Each of the fragments thus defined (partial data indicated by arrows in FIG. 3) is referred to as "original partial data" in the following description.

In the case of (A), when partial data of the header (data from the middle of the header to the end of the header), the payload of 46 bytes or more, additional data, and the trailer FCS which stores a value corresponding to the original partial data (from the beginning to the middle of the header) and added data (data from the middle of the header to the end of the header (partial data of the header), the payload of 46 bytes or more, the additional data) are not added at their corresponding positions, it is discarded in the Ethernet transmission line.

In the case of (B), when a payload of padding to make a payload of 46 bytes or more, additional data, and the trailer FCS which stores a value corresponding to the original partial data (from the beginning of the header to the end of the header, or from the beginning of the header to the middle of the payload, or from the beginning of the header to the end of the payload) and added data (the payload of padding, and the additional data) are not added at their corresponding positions, it is discarded in the Ethernet transmission line.

In the case of (C), when the trailer FCS which stores a value corresponding to the original partial data (from the beginning of the header to the middle of the payload, or from the beginning of the header to the end of the payload) and additional data is not added at the corresponding position, it is discarded in the Ethernet transmission line. Note that, in the cases (A) to (C), the additional data is not essential. In the cases of (D) to (H), the additional data is also not essential, but if there is additional data, it is necessary to set the FCS to values according to the data including the additional data.

In the case of (D), when the trailer which stores an FCS value corresponding to partial data (header and payload) excluding the FCS in the original partial data is not at the corresponding position, it is discarded in the Ethernet transmission line. Note that, in the case of (D), since the original partial data already contains a part of the FCS, it is necessary to add a value to the original partial data so that the header, the payload, and the value of the trailer FCS have the above-mentioned relationship. The place where the value is to be added may be a part of the trailer or the payload of the original partial data. Further, if the part of the FCS included in the original partial data is also regarded as a payload in addition to the payload included in the original partial data, a trailer FCS which stores a value corresponding to the data is added at the corresponding position.

In the case of (E), when the trailer FCS which stores a value corresponding to added data (missing header part (i.e., part from the beginning to the middle of the header) or a new header, and additional data) and the original partial data (part of the header, payload, trailer) is not at the corresponding position, it is discarded in the Ethernet transmission line.

In the case of (F), when a new header, and the trailer FCS which stores a value corresponding to a payload of padding for the payload of less than 46 bytes, additional data, added data (new header, 4 payload of padding for the payload of less than 46 bytes, additional data), and the original partial data are not added at their corresponding positions, it is discarded in the Ethernet transmission line.

In the case of (C), when a new header, a payload of padding to make a payload of 46 bytes or more, and the trailer FCS which stores a value corresponding to added data and the original partial data (from the middle of the payload to the end of the payload, and from the beginning to the end of the trailer FCS) are not added at their corresponding positions, it is discarded in the Ethernet transmission line.

In the case of (H), when a new header, a payload of padding to make a payload of 46 bytes or more, and the trailer FCS which stores a value corresponding to additional data, added data (new header, payload of padding to make a payload of 46 bytes or more, and additional data), and the original partial data (from the middle of the trailer FCS to the end of the FCS) are not added at their corresponding positions, it is discarded in the Ethernet transmission line.

Note that, when the frame length is insufficient but not discarded, (B) may be the same as (C), and (G) may be the same as (F). When the payload length is limited to, for example, 1500 bytes, and the length of the part corresponding to the payload after addition exceeds the limit in (D), (E), (F), and others, it can be fragmented and processed as a plurality of Ethernet frames.

Further, the addition of FCS for (E) to (H) may be rewriting of the original FCS of the partial data.

Of the three operation examples described below, in two examples of the first and second operation examples, at least the fragmented frame may be held without being transmitted to the Ethernet transmission line until it is defragmented, and then a defragmented frame may be transmitted to the Ethernet transmission line. In the remaining third operation example, as described above, the fragmented frame is supplemented and transmitted in a format that is not discarded in the Ethernet transmission line.

(First Operation Example)

Figure 4:
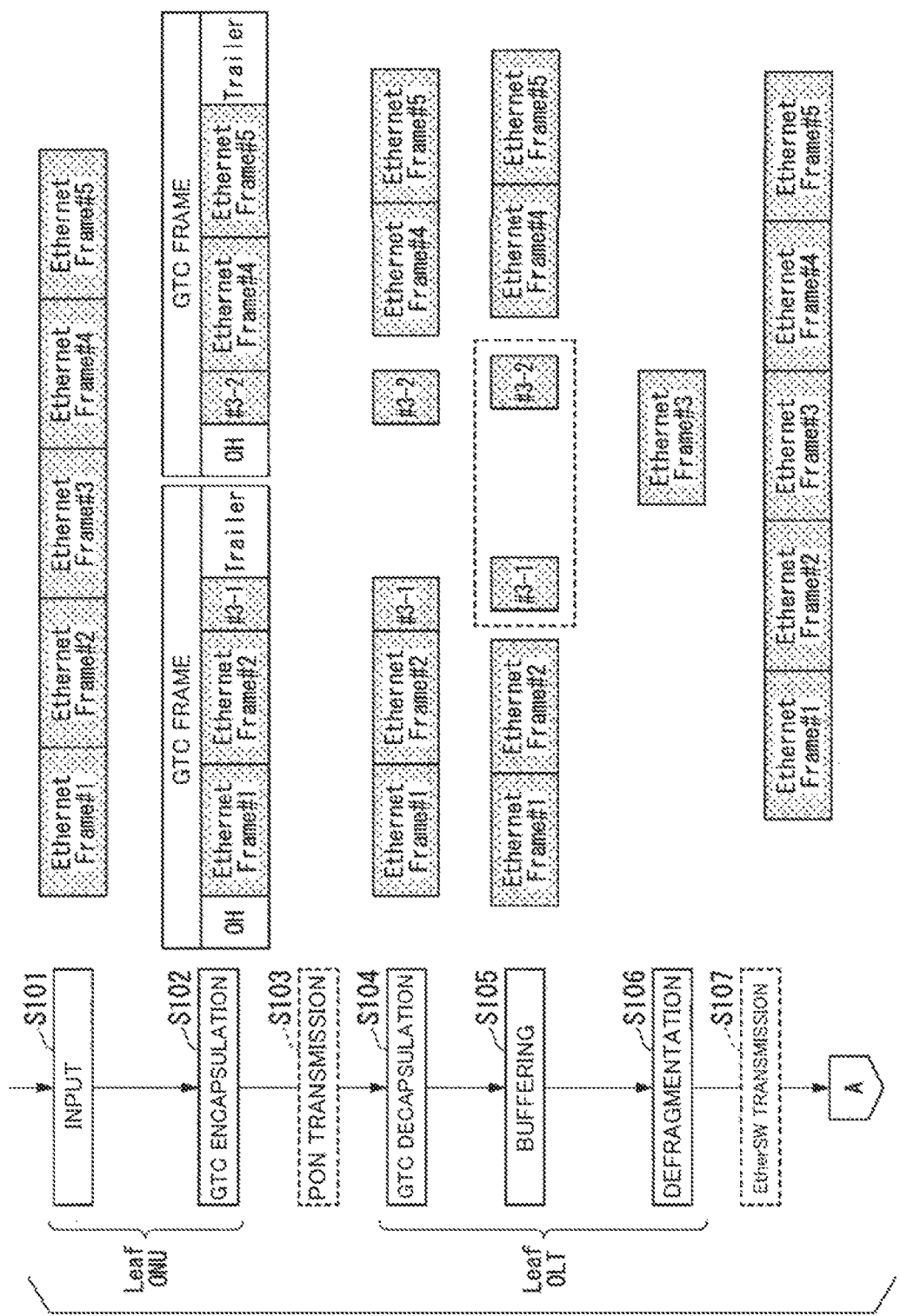
FIG. 4 illustrates a first operation example of the communication system 100.
Figure 5:
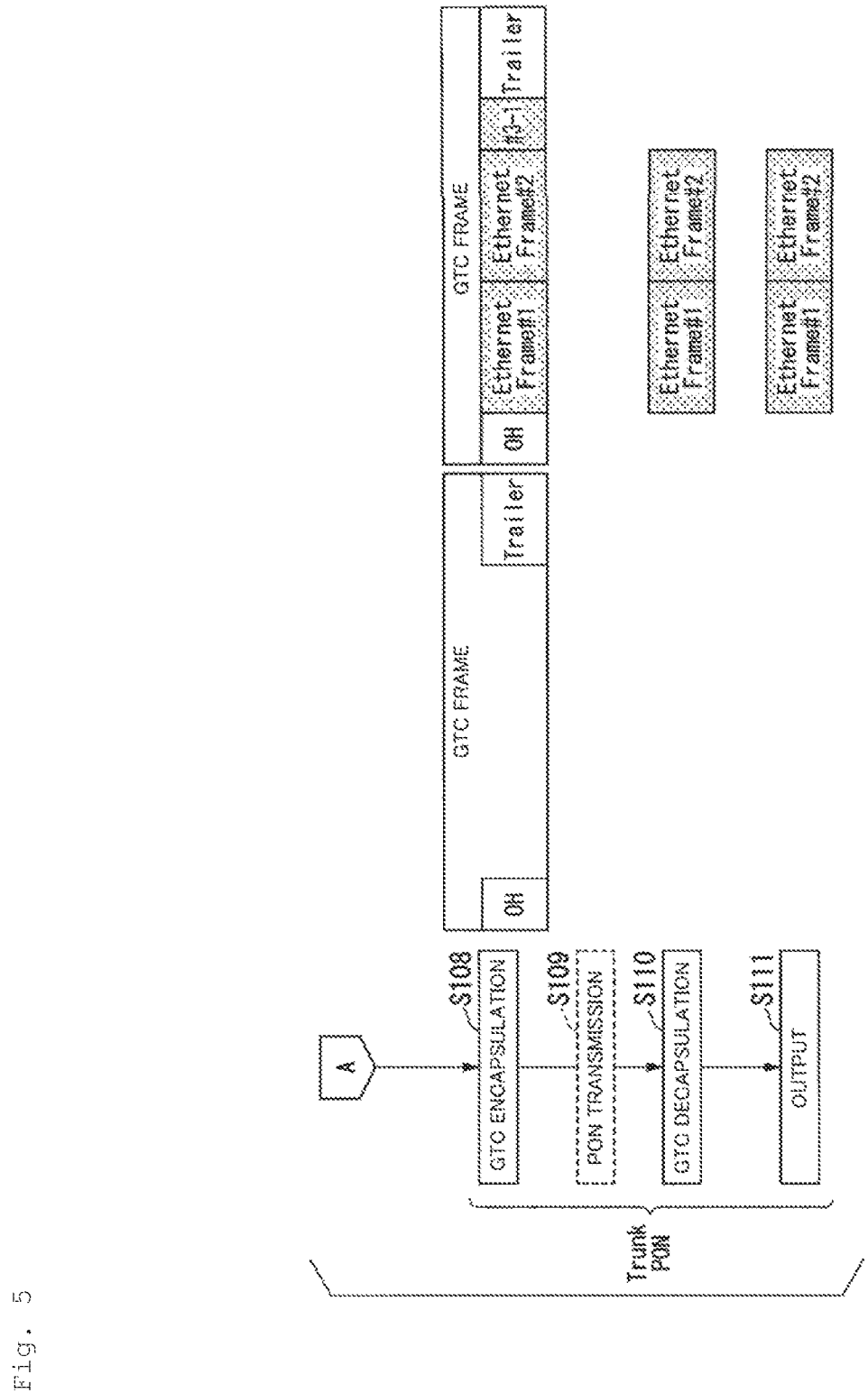
FIG. 5 illustrates the first operation example of the communication system 100.

FIGS. 4 and 5 illustrate the first operation example of the communication system 100. First, user data in the uplink is input to the Leaf ONU 40 (step S101). In the example of FIG. 4, five Ethernet frames (Ethernet Frame) #1 to #5 are input. The Leaf ONU 40 produces GTC frames from the input Ethernet frames (step S102). In this step of processing, the five Ethernet frames are encapsulated in two GTC frames. Specifically, Ethernet frames #1 and #2 and a part (#3_1) of Ethernet frame #3 are encapsulated in the first GTC frame, and the remaining part (#3_2) of Ethernet frame #3 and Ethernet frames #4 and #5 are encapsulated in the second GTC frame. In this way, in the encapsulation in the GTC frames, one or some of the Ethernet frames (e.g., #3) are fragmented to be divided into a plurality of pieces of partial data (e.g., #3_1 and #3_2). Then, the GTC frames are transmitted from the Leaf ONU 40 toward the bridge 30. This transmission is performed by PON transmission (step S103).

In the Leaf OLT 33 of the bridge 30, a first communication unit 331 receives the GTC frames transmitted through the PON. A control unit 335 decapsulates the received GTC frames (step S104). The control unit 335 buffers the Ethernet frames (e.g., Ethernet frames #1, #2 and #3_1) obtained by decapsulation in a buffer 333 (step S105). When the Ethernet frames (#3_2, #4, and #5) in the GTC frame received at the next communication timing are buffered, the control unit 335 defragments (combines) the fragmented pieces of partial data #3_1 and #3_2 (step S106). In this step of processing, Ethernet frame #3 before fragmentation is produced. The control unit 335 transmits the respective Ethernet frames to the Trunk ONU 31 via a second communication unit 332 and the Ethernet transmission line 32 (step S107).

The second communication unit 312 of the Trunk ONU 31 receives the respective Ethernet frames (#1 to #5) from the Leaf OLT 33 via the Ethernet transmission line 32. The control unit 315 produces GTC frames from the received Ethernet frames in (step S108). In producing the GTC frames, the respective Ethernet frames (#1 to #5) are encapsulated in the GTC frames.

Note that, in the Leaf OLT 33, all the Ethernet frames encapsulated in the GTC frames are buffered for defragmentation from the reception of the first GTC frame to the reception of at least a fragmented part of the next GTC frame. Accordingly, there is a time lag corresponding to the time required for processing at least one of the GTC frames. In FIG. 5, in processing of producing the GTC frames in step 108, any Ethernet frames are not encapsulated in the first GTC frame, and Ethernet frames #1, #2, and #3_1 are encapsulated in the second GTC frame. Then, although not illustrated, Ethernet frames #3_2, #4, and #5 are encapsulated in the third and subsequent GTC frames. Then, the control unit 315 transmits the GTC frames from the first communication unit 311 to the Trunk OLT 20 at any time. This transmission is performed by PON transmission (step S109).

The Trunk OLT 20 receives the GTC frames transmitted through the PON. The Trunk OLT 20 decapsulates the received GTC frames (step S110). The Trunk OLT 20 defragments the fragmented Ethernet frames among the Ethernet frames obtained by decapsulation. In these steps of processing, the respective Ethernet frames (#1 to #5) which are the pieces of user data input to the Leaf ONU 40 are restored and output (step S111).

In that first operation example, the fragmented Ethernet frames are defragmented and then transmitted in the Ethernet transmission line 32 of the bridge 30. Therefore, it is possible to prevent the partial data of each fragmented Ethernet frame from being discarded in the Ethernet transmission line 32.

Note that, in the above description, all the Ethernet frames encapsulated in the GTC frames are buttered, but only a GEM frame including the fragmented Ethernet frames among the GTC frames may be buffered. In this case, a GEM frame that does not include any unfragmented Ethernet frames is promptly transmitted to the Trunk ONU 31 without being buffered to wait for the next GTC frame. This makes it possible to perform communication at an earlier timing. Note that, for a GEM frame including only one or less Ethernet frame, the second operation example described below is applied.

(Second Operation Example)

Figure 6:
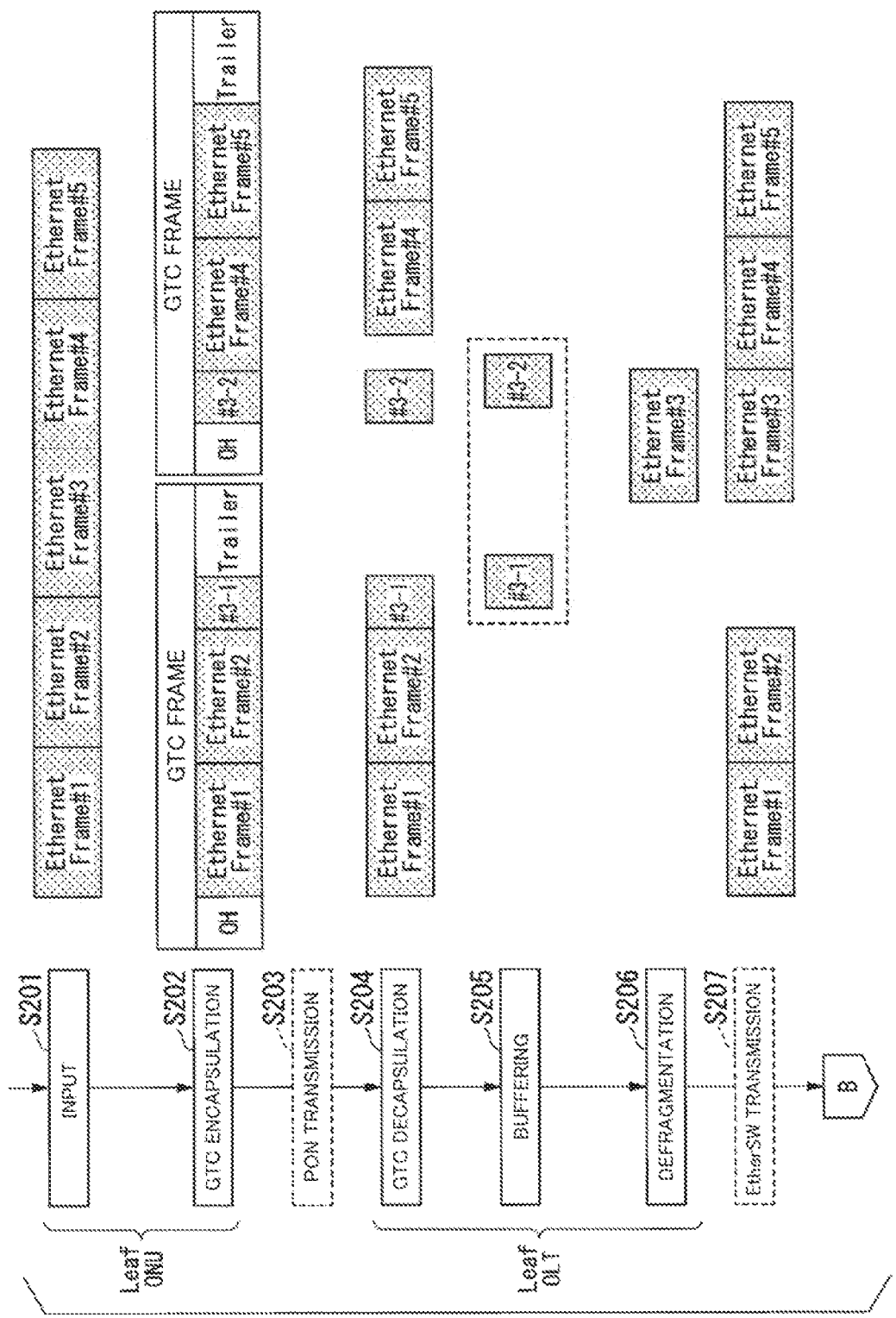
FIG. 6 illustrates a second operation example of the communication system 100.
Figure 7:
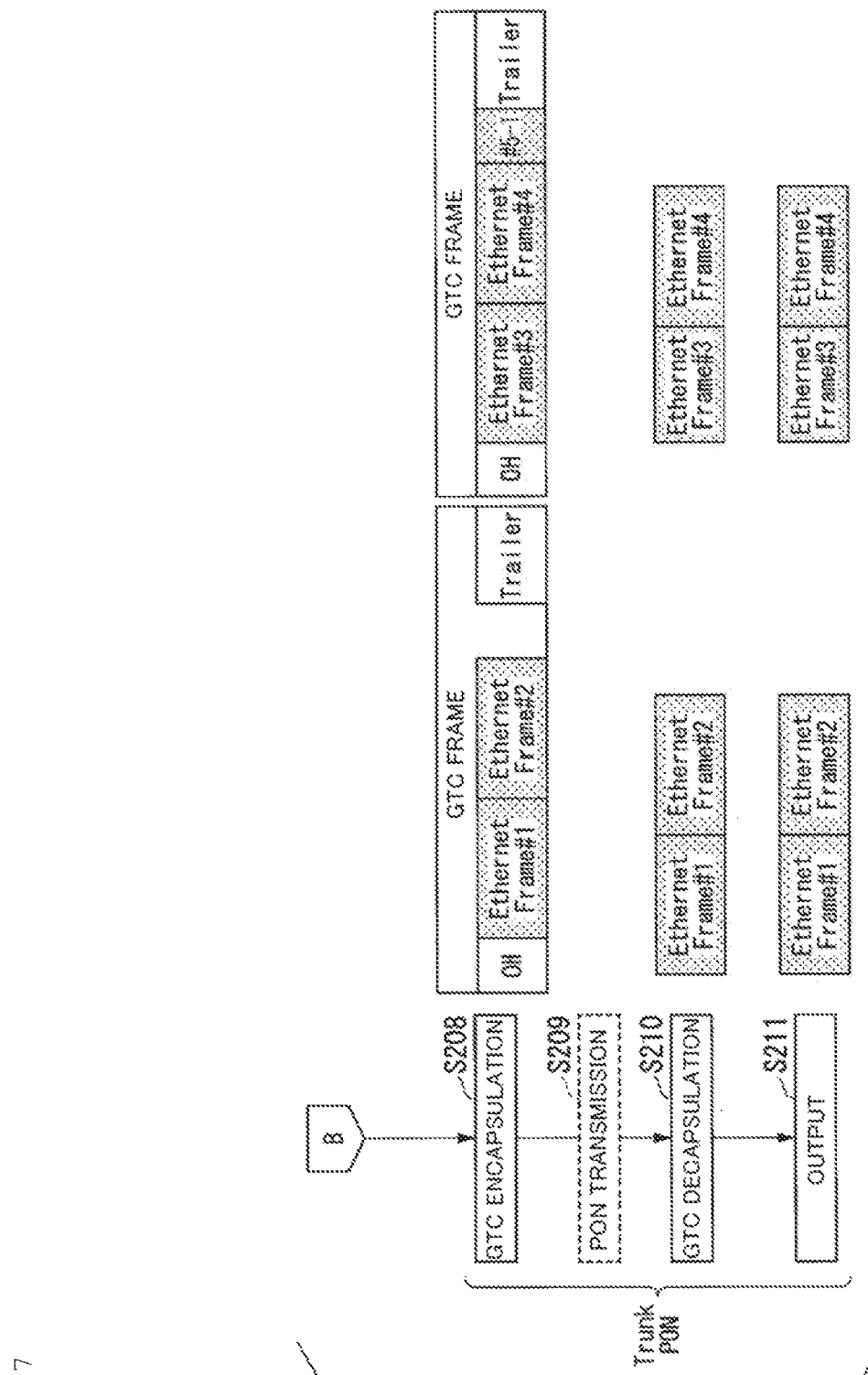
FIG. 7 illustrates the second operation example of the communication system 100.

FIGS. 6 and 7 illustrate the second operation example of the communication system 100. First, user data in the uplink is input to the Leaf ONU 40 (step S201). In the example of FIG. 6, five Ethernet frames (Ethernet Frame) #1 to #5 are input. The Leaf ONU 40 produces GTC frames from the input Ethernet frames (step S202). Then, the GTC frames are transmitted from the Leaf ONU 40 toward the bridge 30. This transmission is performed by PON transmission (step S203). The processing of steps S201 to S203 are the same as those of steps S101 to S103 described above, and thus their description is simplified.

In the Leaf OLT 33 of the bridge 30, the first communication unit 331 receives the GTC frames transmitted through the PON. The control unit 335 decapsulates the received GTC frames (step S204). The control unit 335 buffers only partial data (e.g., Ethernet frames #3_1) of the Ethernet frames obtained by decapsulation in the buffer 333 (step S205). Note that unbuffered Ethernet frames, that is, unfragmented Ethernet frames are promptly transmitted to the Trunk ONU 31 via the second communication unit 332 and the Ethernet transmission line 32 without being buffered (step S207).

When the next GTE frame is received, the control unit 335 decapsulates the received GTC frames and buffers only the partial data (e.g., Ethernet frame #3_2). This buffering results in complete pieces of partial data related to Ethernet frame #3. Thus, the control unit 335 restores Ethernet frame #3 by performing defragmentation (step S206). Then, the control unit 335 transmits the respective Ethernet frames to the Trunk ONU 31 via the second communication unit 332 and the Ethernet transmission line 32 (step S207).

The second communication unit 312 of the Trunk ONU 31 receives the respective Ethernet frames (#1 to #5) from the Leaf OLT 33 via the Ethernet transmission line 32. The control unit 315 produces GTC frames from the received Ethernet frames in (step S208). In producing the GTC frames, the respective Ethernet frames (#1 to #5) are encapsulated in the GTC frames. Note that, in the second operation example, unlike the first operation example, the data buffered for defragmentation from the reception of the first GTC frame to the reception of at least a fragmented part of the next GTC frame in the Leaf OLT 33 is only partial data, and the unfragmented Ethernet frames (#1 and #2) are promptly transmitted to the Trunk ONU 31. Accordingly, in the second operation example, at least the unfragmented Ethernet frames (#1 and #2) can be encapsulated in GTC frames and transmitted by the PON at an earlier timing than the first operation example (step S209). Then, the control unit 315 transmits the GTC frames from the first communication unit 311 to the Trunk OLT 20 at any time. This transmission is performed by PON transmission (step S209).

The Trunk OLT 20 receives the GTC frames transmitted through the PON. The Trunk OLT 20 decapsulates the received GTC frames (step S210). The Trunk OLT 20 defragments the fragmented Ethernet frames among the Ethernet frames obtained by decapsulation. In these steps of processing, the respective Ethernet frames (#1 to #5) which are the pieces of user data input to the Leaf ONU 40 are restored and output (step S211).

In that second operation example, the fragmented Ethernet frames are defragmented and then transmitted in the Ethernet transmission line 32 of the bridge 30. Therefore, it is possible to prevent the partial data of each fragmented Ethernet frame from being discarded in the Ethernet transmission line 32.

Further, in that second operation example, as described above, the unfragmented Ethernet frames of the Ethernet frames included in the GTC frames are promptly transmitted to the Trunk ONU 31 without being buffered to wait for the next GTC frame. This makes it possible to perform communication at an earlier timing.

(Third Operation Example)

Figure 8:
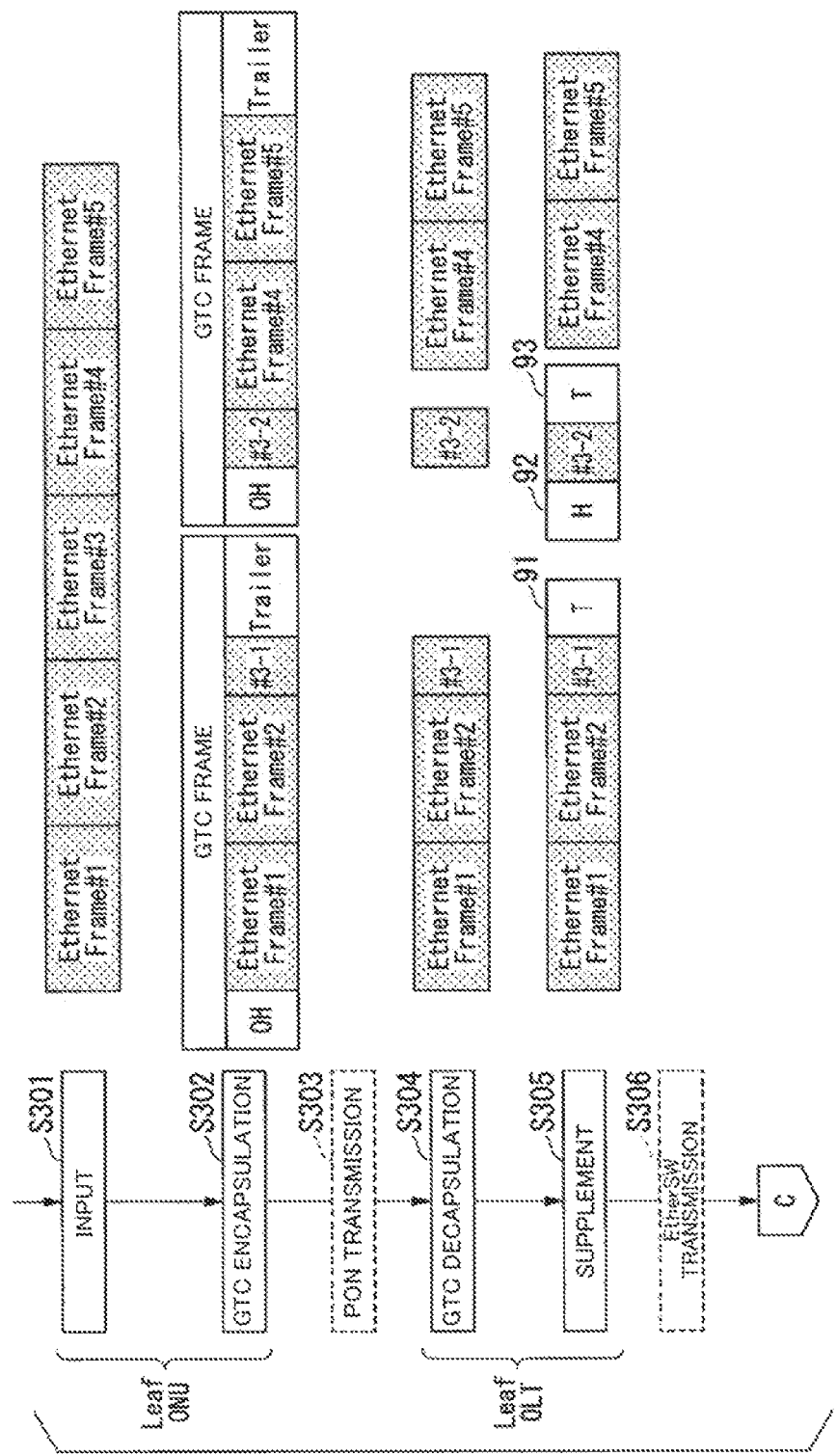
FIG. 8 illustrates a third operation example of the communication system 100.
Figure 9:
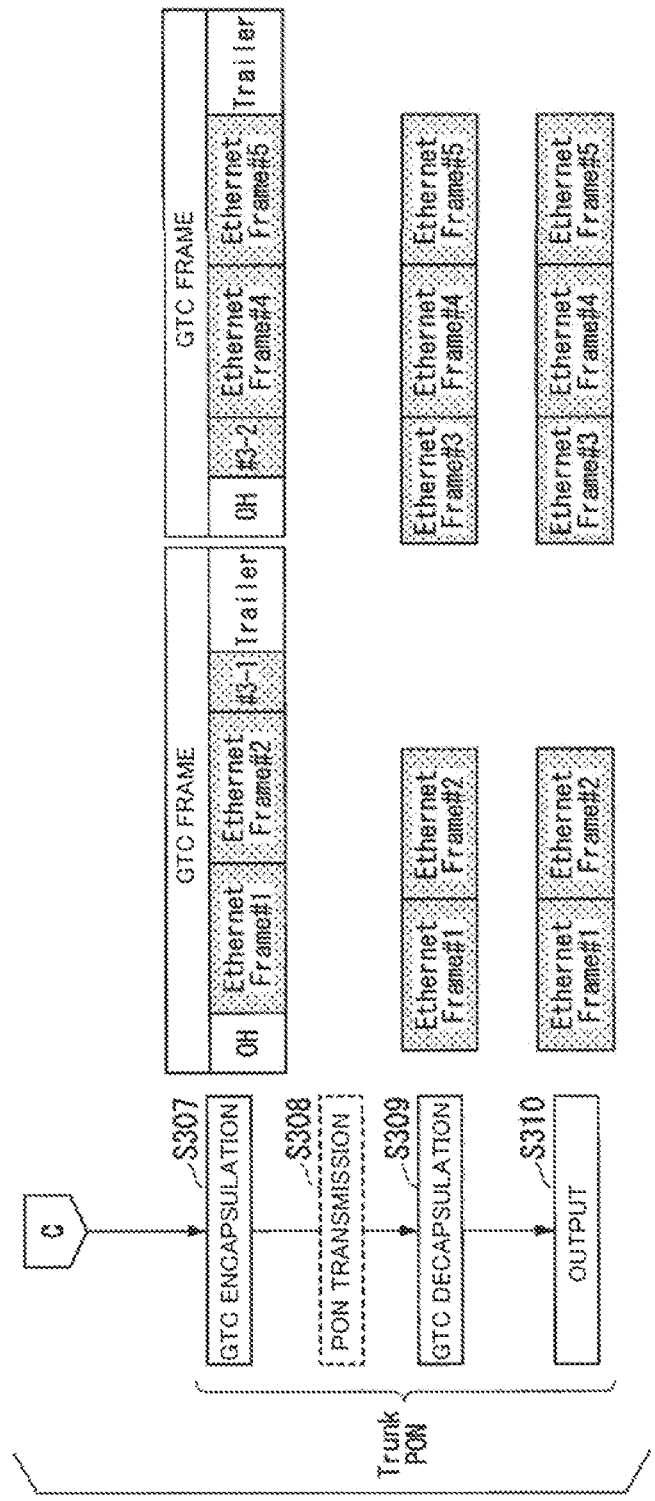
FIG. 9 illustrates the third operation example of the communication system 100.
Figure 10:
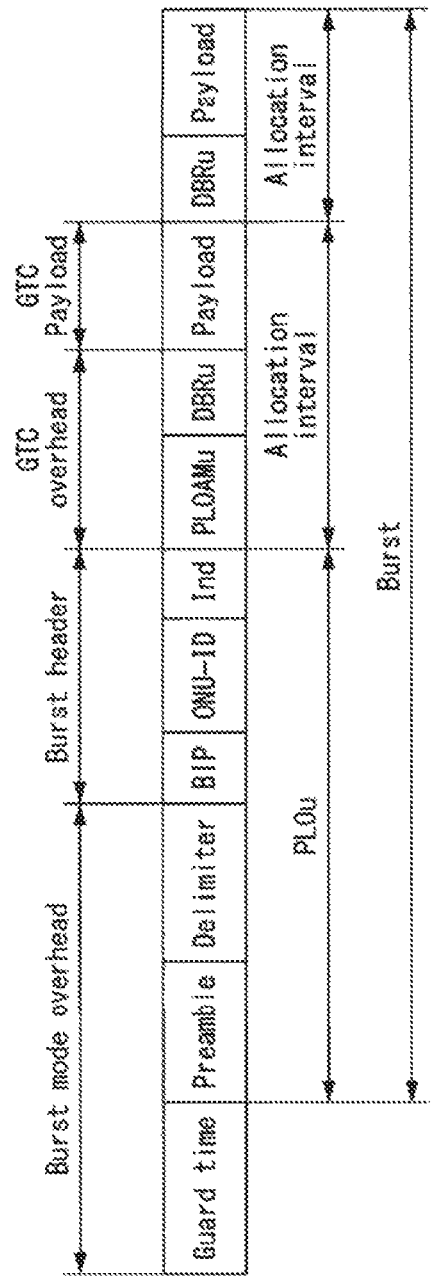
FIG. 10 illustrates the overhead of the physical layer and the GTC layer related to an upstream burst.
Figure 11:
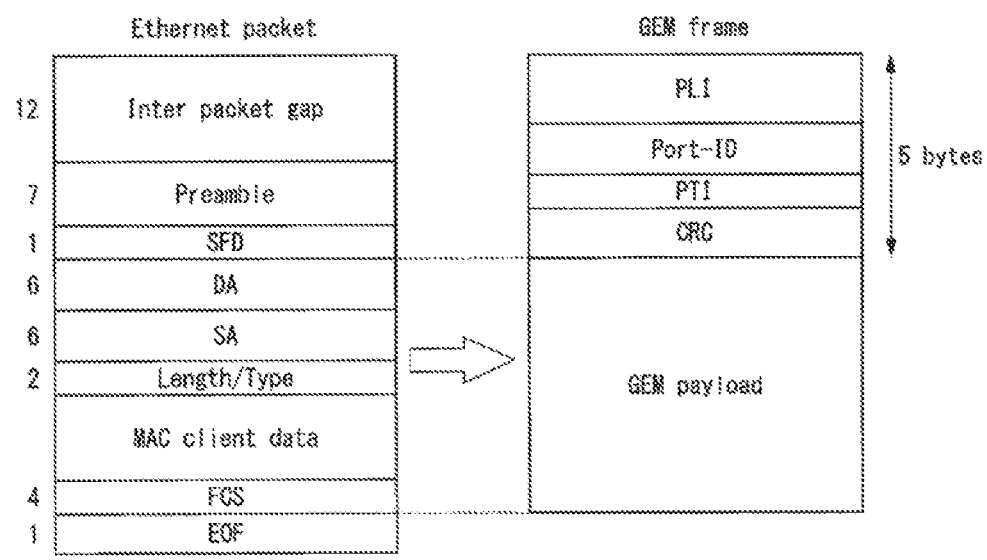
FIG. 11 illustrates an example of encapsulating an Ethernet frame in a GEM frame.

FIGS. 8 and 9 illustrate the third operation example of the communication system 100. First, user data in the uplink is input to the Leaf ONU 40 (step S301). In the example of FIG. 8, five Ethernet frames (Ethernet Frame) #1 to #5 are input. The Leaf ONU 40 produces GTC frames from the input Ethernet frames (step S302). Then, the GTC frames are transmitted from the Leaf ONU 40 toward the bridge 30. This transmission is performed by PON transmission (step S303). The processing of steps S301 to S303 are the same as those of steps S101 to S103 described above, and thus their description is simplified.

In the Leaf OLT 33 of the bridge 30, the first communication unit 331 receives the GTC frames transmitted through the PON. The control unit 335 decapsulates the received GTC frames (step S304). The control unit 335 performs supplement processing on the data obtained by decapsulation (step S305).

The supplement processing will be described. The supplement processing is processing of adding data to the head part or the end part of the data obtained by decapsulation so as to obtain a correct Ethernet frame that is not discarded as an abnormality at least in terms of the structure of the data.

Hereinafter, fragment (C) and fragment (F) will be described first, and the other cases will be supplemented.

When the head part of a set of data obtained by, for example, decapsulating a GTC frame (data obtained by decapsulating one GTC frame) is not partial data, that is, when it is an unfragmented Ethernet frame, the control unit 335 may determine that data is not to be added to the head part. This is because the unfragmented Ethernet frame contains the correct data as the head part of the Ethernet frame. For example, data set of Ethernet frames #1 and #2 in FIG. 8 is Ethernet frames #1 and #2 in which the head part is not fragmented. Accordingly, in the supplement processing, no data is added to the head part.

Even for partial data, that is, a fragmented Ethernet frame, when there is no missing in the header of the Ethernet frame as represented in fragments (B), (C), and (D), it may be determined that data is not to be added to the head part. This is because the unfragmented Ethernet frame contains the correct data as the head part of the Ethernet frame. Further, even for an unfragmented Ethernet frame, when there is no missing in the header or the Ethernet frame as represented in fragment (C) and the frame length required as the Ethernet frame is satisfied even if a trailer FCS to be added later is added, it may be determined that data is not to be added to the head part or the middle part. This is because the unfragmented Ethernet frame contains the correct data as the head part of the Ethernet frame and the minimum frame length is satisfied.

For example, assume that, in the data set of Ethernet frame #3-1 in FIG. 8, the head part is not fragmented, there is no missing in the header of the Ethernet frame, and the frame length required as an Ethernet frame is satisfied by adding a trailer FCS to be added later. In this case, in the supplement processing, no data is added to the head part or the middle part. Here, the frame length required as an Ethernet frame is 64 bytes or more, 60 bytes or more excluding the FCS of 4 bytes, and the payload is 46 bytes or more.

When the head part of a data set obtained by, for example, decapsulating a GTC frame is an unfragmented Ethernet frame and any part of the data set contains fragmented partial data, the control unit 335 may determine that data is to be added to the end part of the partial data. This is because when partial data is contained, the partial data does not have full end part data (trailer) or data such as error check included in the end part data (trailer) does not have the correct value. Therefore, the control unit 335 generates data for a new end part so that the partial data of the end part data is correct data as a set of data, and adds the generated data to the end of the partial data. For example, the data set of Ethernet frames #1, #2, and #3_1 in FIG. 8 contains fragmented partial data #3_1. Accordingly, in the supplement processing, the data 91 is added to the end part of fragmented partial data #3_1. Data 91 is at least a trailer FCS in fragment (C). The data 91 may include data other than the FCS.

When a part of the trailer is not included as in fragment (D), the data such as error check included in the end part data (trailer) does not have the correct value. In this case, the FCS when the trailer part included in fragment (D) is also a part of the payload may be added as at least the data 91. Alternatively, only the missing trailer part that is not included in the partial data may be added to fragment (D) so that the FCS value is the correct value. Here, in the supplement processing, if another header is not added, or the part other than the header and trailer is not rewritten, or data is not added to a part other than the trailer, the data 91 to be added may be removed in GTC decapsulation or defragmentation. Further, instead of removing the data 91 to be added, the rest of the trailer part of the subsequent partial data may be deleted. In this case, only the missing trailer part may be added so that the FCS value is the correct value.

By performing this supplement processing, the data set including partial data #3_1 is treated as a correct Ethernet frame. Therefore, it is not discarded in the Ethernet transmission line 32.

In the case of fragment (A), the control unit 335 operates as follows.

If the minimum Ethernet frame length (hereinafter referred to as "minimum frame length") required for the transmission line is satisfied by adding the missing part of the header (from the middle to the end of the header) and the trailer to the original partial data, the missing part of the header and the trailer is added to the original partial data.

If the minimum frame length is not satisfied by adding the missing part of the header (from the middle to the end of the header) and the trailer to the original partial data, the missing part of the header, a payload of padding to satisfy the minimum frame length, and the trailer are added to the original partial data.

If the minimum frame length is satisfied by adding a new header for the Ethernet frame and a trailer, the new header and the trailer are added to the original partial data.

Note that, if the minimum frame length is not satisfied by adding a new header for the Ethernet frame and a trailer, the new header, a payload of padding to satisfy the minimum frame length, and the trailer may be added.

Here, the minimum frame length is typically 64 bytes. In that case, the payload for the minimum frame length condition is 46 bytes. Since the original partial data is at most 14 bytes, the minimum frame length is typically not satisfied.

In the case of fragment (B) or (C), the control unit 335 operates as follows.

If the minimum frame length is satisfied by adding a trailer, the trailer is added.

If the minimum frame length is not satisfied by adding a trailer, a payload of padding to satisfy the minimum frame length and the trailer are added.

If the minimum frame length is satisfied by adding a new header for the Ethernet frame and a trailer, the new header and the trailer are added.

Note that, if the minimum frame length is not satisfied by adding a new header for the Ethernet frame and a trailer, the new header, a payload of padding to satisfy the minimum frame length, and the trailer may be added. This is because it does not satisfy the requirements for a correct Ethernet frame.

If a new Ethernet header is not added, the processing is performed as follows.

In the case of fragment (A), the control unit 335 operates so as to satisfy the following three conditions.

Condition 1) The head part is a correct Ethernet header.
Condition 2) The minimum frame length is satisfied.
Condition 3) The trailer FCS in the end part is a correct value.

Specifically the control unit 335 operates as follows, for example.

If the minimum frame length is satisfied, missing part data of the header and new end part data are generated. Then, they are added at their corresponding positions. For example, the missing part data of the header is added to the end of the header of the Ethernet frame. The new end part data is added to the end of the partial data.

If the minimum frame length is not satisfied, missing part data of the header, a payload of padding to satisfy the minimum frame length, and new end part data are generated. Then, they are added at their corresponding positions. For example, the missing part data of the header is added to the end of the header of the Ethernet frame. The payload is added to a part after the end of the added header and before the trailer. The payload also needs to be in a position that can be identified and removed in the next GTC encapsulation or defragmentation. The new end part data is added to the end of the partial data.

In the case of fragment (B) or (C), the control unit 335 operates so as to satisfy the following two conditions.

Condition 4) The minimum frame length is satisfied.
Condition 5) The trailer FCS in the end part is a correct value.

Specifically, the control unit 335 operates as follows, for example.

If the minimum frame length is satisfied, new end part data is generated and added to the end of the partial data.

If the minimum frame length is not satisfied, a payload of padding to satisfy the minimum frame length, and new end part data are generated. Then, the payload is added to a part after the end of the header and before the trailer. The payload also needs to be in a position that can be identified and removed in the next GTC encapsulation or defragmentation. The new end part data is added to the end of the partial data.

In the case of adding a new Ethernet header, the processing is performed so that the following three conditions are satisfied.

Condition 6) The head part is a correct Ethernet header.
Condition 7) The minimum frame length is satisfied.
Condition 8) The trailer FCS in the end part is a correct value.

Specifically, the control unit 335 operates as follows, for example.

If the minimum frame length is satisfied, a new header for the Ethernet frame and new end part data are generated. Then, the new header is added to the beginning of the original partial data, and the new end part data is added to the end of the original partial data.

If the minimum frame length is not satisfied, a new header for the Ethernet frame, a payload of padding to compensate for the insufficient Ethernet frame length, and new end part data are generated. Then, the new header is added to the beginning of the original partial data. The payload is added to a part after the end of the added header and before the trailer. The payload also needs to be in a position that can be identified and removed in the next GTC encapsulation or defragmentation. The new end part data is added to the end of the original partial data.

Further, when the end part of a data set obtained by, for example, decapsulating a GTC frame is fragmented data and the partial data does not include a part of the header of the Ethernet frame, the control unit 335 may determine that it is to be discarded. This is because it does not satisfy the requirements for a correct Ethernet frame. Note that, with discarding, it is necessary to supplement the discarded partial data. Regarding this point, in the next GTC encapsulation or defragmentation, for example, when the remaining part is transmitted with a header added for the Ethernet frame, the header part of the Ethernet frame discarded in defragmentation of the remaining data of the fragmented data may be supplemented. For example, when the remaining part in which the missing part of the header of the Ethernet frame is supplemented is transmitted, the supplemented header part of the Ethernet frame may not be discarded to supplement the discarded header part of the Ethernet frame.

As a result of these steps of processing, a frame that is not treated as a correct Ethernet frame is not transmitted through the Ethernet transmission line 32 and discarded.

If the head part of a data set obtained by, for example, decapsulating a GTC frame is fragmented partial data, the control unit 335 may extract the partial data and determine that data is to be added to the head part and the end part of the partial data. This is because the head part and the end part of the fragmented partial data do not contain the correct data as an Ethernet frame. For example, in partial data #3_2 in FIG. 8, data 92 is added to the head part and data 93 is added to the end part in the supplement processing.

If partial data #3_2 is partial data, that is, a fragmented Ethernet frame as represented in fragment (F) and the frame length required as an Ethernet frame is satisfied by adding data to be added later, the data 92 may be the header of the Ethernet frame and the data 93 may be the trailer FCS. The trailer FCS included in the partial data may be rewritten to a correct value so that the data 93 is not added.

Here, when only a part of the header of an Ethernet frame is included as in fragment (E), the added part may be deleted in GTC decapsulation or defragmentation. Further, in order to delete the first part of the Ethernet header of the previously transmitted partial data without deleting the added part, only the insufficient Ethernet part may be added as the data 92 with respect to the Ethernet header. Moreover, in this case, since the FCS value is a correct value, it is not necessary to further add the data 93. By performing this supplement processing, partial data #3_2 is treated as a correct Ethernet frame. Therefore, it is not discarded in the Ethernet transmission line 32.

In the case of fragment (F) or (G), the control unit 335 operates as follows.

If the minimum frame length is satisfied by adding a header for the Ethernet frame, the header is added.

If the minimum frame length is not satisfied even by adding a header for the Ethernet frame, the header and a payload of padding to satisfy the minimum frame length are added.

If the minimum frame length is satisfied by adding a header for the Ethernet frame and a new trailer, the header and the new trailer are added.

If the minimum frame length is not satisfied even by adding a header for the Ethernet frame and a new trailer, the header, a payload of padding to satisfy the minimum frame length, and the new trailer are added.

In the case of fragment (H), the control unit 335 operates as follows.

If the minimum frame length is satisfied by adding a header for the Ethernet frame and the missing part of the trailer, the header and the missing part of the trailer are added.

If the minimum frame length is not satisfied even by adding a header for the Ethernet frame and the missing part of the trailer, the header, a payload, and the missing part of the trailer are added.

If the minimum frame length is satisfied by adding a header for the Ethernet frame and a new trailer, the header and the new trailer are added.

If the minimum frame length is not satisfied even by adding a header for the Ethernet frame and a new trailer, the header, a payload, and the new trailer are added. This is because it does not satisfy the requirements for a correct Ethernet frame.

If a new trailer is not added, the processing will be as follows.

In the case of fragment (F) or (G) the control unit 335 operates so as to satisfy the following three conditions.

Condition 9) The head part is a correct Ethernet header.
Condition 10) The minimum frame length is satisfied.
Condition 11) The trailer FCS in the end part is a correct value.

Specifically, the control unit 335 operates as follows, for example.

If the minimum frame length is satisfied, a new header is generated and added to the beginning of the original partial data. Then, the trailer in the end part is rewritten so that the FCS has the correct value.

If the minimum frame length is not satisfied, a new header and a payload of padding to satisfy the minimum frame length are generated. Then, they are added at their corresponding positions. For example, the new header is added to the beginning of the original partial data. The payload is added after the end of the added header and before the trailer added to the end. The payload needs to be added in a position that can be identified and removed in the next GTC encapsulation or defragmentation. Further, the trailer in the end part is rewritten so that the FCS has the correct value.

In the case of fragment (H), the control unit 335 operates so as to satisfy the following three conditions.

Condition 12) The head part is a correct Ethernet header.
Condition 13) The minimum frame length is satisfied.
Condition 14) The trailer FCS in the end part is a correct value.

Specifically, the control unit 335 operates as follows, for example.

If the minimum frame length is satisfied, a new header is generated and added to the beginning of the partial data. Then, the trailer in the end part is rewritten so that the FCS has the correct value.

If the minimum frame length is not satisfied, a new header and a payload of padding to satisfy the minimum frame length for the insufficient frame are generated. The new header is added to the beginning of the partial data. The payload is added after the end of the added header and before the trailer added to the end. The payload also needs to be added in a position that can be identified and removed in the next GTC encapsulation or defragmentation. The trailer in the end part is rewritten so that the FCS has the correct value.

In the case of adding a new trailer, the processing is performed as follows.

In the case of fragment (F), (G), or (H), the control unit 335 operates so as to satisfy the following three conditions.
   Condition 15) The head part is a correct Ethernet header.
   Condition 16) The minimum frame length is satisfied.
   Condition 17) The trailer FCS in the end part is a correct value.

Specifically, the control unit 335 operates as follows, for example.

If the minimum frame length is satisfied, a new header and new end part data are generated. The new header is added to the beginning of the original partial data. The new end part data is added to the end of the original partial data.

If the minimum frame length is not satisfied, a new header, a payload of padding to satisfy the minimum frame length for the insufficient frame, and new end part data are generated. The new header is added to the beginning of the original partial data. The payload is added after the end of the added header and before the trailer added to the end. The payload also needs to be in a position that can be identified and removed in the next GTC encapsulation or defragmentation. The new end part data is added to the end of the partial data.

By performing these supplement processing, the partial data is treated as a correct Ethernet frame. Therefore, it is not discarded in the Ethernet transmission line 32.

Further, when the head part of a data set obtained by, for example, decapsulating a GTC frame is fragmented partial data and the partial data does not include any part other than the FCS, the control unit 335 may determine that it is to be discarded. This is because it does not satisfy the requirements for a correct Ethernet frame. Note that, with discarding, it is necessary to supplement the discarded partial data. Therefore, in the previous GTC encapsulation or defragmentation, when the previously transmitted remaining part is transmitted with a trailer added for the Ethernet frame, an FCS may be calculated and the discarded missing part may be added so that the discarded Ethernet frame trailer is supplemented. Further, when the previously transmitted remaining part in which the missing part of the FCS of the Ethernet frame is supplemented is transmitted, the supplemented FCS part of the Ethernet frame may not be discarded to supplement the discarded header part of the Ethernet frame. As a result of these steps of processing, a frame that is not treated as a correct Ethernet frame is not transmitted through the Ethernet transmission line 32 and discarded.

When the head part of a data set obtained by, for example, decapsulating a GTC frame is unfragmented Ethernet frame and the data set does not include partial data, the control unit 335 may determine that the Ethernet frame is to be transmitted through the Ethernet transmission line 32 as it is without performing the supplement processing. This is because no fragmented partial data is included, and thus each Ethernet frame included in this data set is treated as a correct Ethernet frame.

Here, when data such as error check included in the end part data (trailer) does not have the correct value because a part of the trailer is missing as in fragment (H), the added part may be removed in GTC decapsulation or defragmentation. Further, instead of removing the added part, the rest of the trailer part of the subsequent partial data may be removed, and only the missing trailer part may be added so that the FCS value is the correct value.

After the supplement processing as described above is performed, the supplemented data is transmitted to the Trunk ONU 31 via the Ethernet transmission line 32 (step S306).

The second communication unit 312 of the Trunk ONU 31 receives the respective Ethernet frames from the Leaf OLT 33 via the Ethernet transmission line 32. The control unit 315 removes the head part data or end part data added by the supplement processing from each of the received Ethernet frames, and writes back the rewritten head part data or end part data. Then, the obtained data is encapsulated in GTC frames (step S307). By this GTC frame encapsulation, the same data as the GTC frames generated in the Leaf ONU 40 is reproduced. The control unit 315 of the Trunk ONU 31 transmits the GTC frames from the first communication unit 311 to the Trunk OLT 20 at any time. This transmission is performed by PON transmission (step S308).

The Trunk OLT 20 receives the GTC frames transmitted through the PON. The Trunk OLT 20 decapsulates the received GTC frames (step S309). The Trunk OLT 20 defragments the fragmented Ethernet frames among the Ethernet frames obtained by decapsulation. In these steps of processing, the respective Ethernet frames (#1 to #5) which are the pieces of user data input to the Leaf ONU 40 are restored and output (step S310).

In that third operation example, the fragmented Ethernet frames are subjected to the supplement processing and then transmitted in the Ethernet transmission line 32 of the bridge 30. Therefore, it is possible to prevent the partial data of each fragmented Ethernet frame from being discarded in the Ethernet transmission line 32.

An example of the supplement processing will be described below. The same applies to the case of not transmitting the preamble or the like by using a GTC frame, but in the following description, an example of the case where the preamble or the like is included is first presented.

In the Ethernet II frame format, a frame is transmitted after the preamble. The preamble is an 8-byte synchronization signal that is a signal for informing of the start of frame transmission to give timing for synchronization. The frame contains "header", "data", and "trailer". The header is composed of three fields: a destination MAC address of 6 bytes for identifying the communication partner, a source MAC address of 6 bytes, and a type of 2 bytes indicating the type of the higher layer packet included in the frame, which is a total of 14 bytes. The header is followed by data of 46 to 1500 bytes, followed by the trailer. The trailer is an FCS (Frame Check Sequence) of 4 bytes in which a CRC (Cyclic Redundancy Check) calculated from each field is set. The receiving device calculates a CRC independently, and if the calculated CRC does not match the CRC included in the trailer FCS, it is determined that an error has occurred and the frame is discarded accordingly.

In the case of IEEE 802.2 LLC (Logical Link Control) in the IEEE 802.3 frame format, a preamble of 7 bytes and an SFD of 1 byte are transmitted, followed by a frame. The frame contains "header", "data", and "trailer". The header is composed of three fields: a destination MAC address of 6 bytes, a source MAC address of 6 bytes, and a length/type of 2 bytes, which is a total of 14 bytes. The header is followed by the data. The data includes, in IEEE 802.2 LLC, a destination SAP (Service Access Point) of 1 byte, a source SAP of 1 byte, a control of 1 to 2 bytes, and data+padding of 42 to 1497 bytes. An SAP defines which protocol in the higher layer the data is to be passed next in response receiving the data. The data is followed by a trailer FCS of 4 bytes. The receiving device calculates a CRC independently, and if the calculated CRC does not match the CRC included in the trailer FCS, it is determined that an error has occurred and the frame is discarded accordingly.

Next, an example is described in the case where the preamble and the like are not included.

In the Ethernet II frame format, a frame contains "header", "data", and "trailer". The header is composed of three fields: a destination MAC address of 6 bytes, a source MAC address of 6 bytes, and a type of 2 bytes, which is a total of 14 bytes. The header is followed by data of 46 to 1500 bytes, followed by the trailer. The trailer is an FCS of 4 bytes. The receiving device calculates a CRC independently, and if the calculated CRC does not match the CRC included in the trailer FCS, it is determined that an error has occurred and the frame discarded accordingly.

In the case of IEEE 802.2 LLC in the IEEE 802.3 frame format, a frame includes "header", "data", and "trailer". The header is composed of three fields: a destination MAC address of 6 bytes, a source MAC address of 6 bytes, and a length/type of 2 bytes, which is a total of 14 bytes. The header is followed by the data. The data includes, in IEEE 802.2 LLC, a destination SAP of 1 byte, a source SAP of 1 byte, a control of 1 to 2 bytes, and data+padding of 42 to 1497 bytes. The data is followed by a trailer FCS of 4 bytes. The receiving device calculates a CRC independently, and if the calculated CRC does not match the CRC included in the trailer FCS, it is determined that an error has occurred and the frame is discarded accordingly.

The supplement processing includes the following seven types.
(1) Addition of trailer to partial data with header and without trailer
(2) Addition of header to and rewriting of trailer in partial data without header and with trailer
(3) Addition of header and trailer to partial data with header and without trailer
(4) Addition of header and trailer to partial data without header and with trailer
(5) Rewriting of header in and addition of trailer to partial data with header and without trailer
(6) Rewriting of header and addition of trailer to partial data without header and with trailer
(7) Addition of header and trailer to partial data without header and trailer The addition of header includes addition of the same header as the frame before fragmentation; and addition of a header indicative of partial data. For the header indicative of partial data, for example, a value obtained by replacing the value of a part of the header with a predetermined value, or a value obtained by performing a predetermined operation on the value of a part of the header may be used. For the header indicative of partial data, for example, the value of the destination MAC address, source MAC address, type, or length/type may be used. For the header indicative of partial data, for example, a value obtained by replacing some bytes of the value before fragmentation with a predetermined value, or a value obtained by performing a predetermined operation, such as addition, subtraction, multiplication, and division, may be used. When the above operation is performed, for example, the value of the type may be used as the above-mentioned predetermined value. Instead of rewriting a header, the value of the SAP or control may be rewritten. Moreover, the above-mentioned method may be combined as appropriate. The rewriting of header may be, for example, rewriting to the value of a header indicative of partial data.

The addition of trailer may be addition of an FCS with a CRC calculated from the respective fields. In a case of adding a trailer to the data of a part where the original trailer is present, the original trailer is treated as data for which a CRC is set. The rewriting of trailer may be rewriting to an FCS with a CRC calculated from the respective fields.

Further, in that third operation example, unlike the first operation example and the second operation example, defragmentation is not performed in the Leaf OLT 33. Accordingly, buffering for defragmentation is also not performed. As a result, it is possible to transmit data with a very small delay.

(Modification Example)

In the above description, the communication (uplink communication) for transmission from the Leaf ONU 40 to the Trunk OLT 20 has been described by way of example. However, the same processing may be performed in the communication (downlink communication) for transmission from the Trunk OLT 20 to the Leaf ONU 40.

In the above description, one Ethernet frame is fragmented into two pieces of partial data, and then the two pieces of partial data are defragmented to restore the one Ethernet frame. However, the number of pieces of partial data may be three or more. For example, in the case of transmitting a jumbo frame larger than a GTC frame or in the case of BPON, three or more pieces of partial data may be generated from one Ethernet frame. Further, one Ethernet frame may be generated by combining three or more pieces of partial data.

In the third operation example, when an Ethernet frame is fragmented over three or more frames, only a trailer can be added to a piece of partial data including a header among pieces of partial data. Further, an additional header may be added to a piece of partial data including a header among pieces of partial data on the outside of the piece of partial data and a trailer may be further added thereto. The data of a header for a piece of partial data including the header among pieces of partial data may be rewritten and a trailer may be added thereto. In the third operation example, when an Ethernet frame is fragmented over three or more frames, a header and a trailer are be added to a piece of partial data including no header or trailer among pieces of partial data. In the third operation example, when an Ethernet frame is fragmented over three or more frames, a header may be added to a piece of partial data including a trailer among pieces of partial data and an additional trailer may be added on the outside of the piece of partial data. Further, a header may be attached to a piece of partial data including a trailer among pieces of partial data, and the data of the trailer originally included may be rewritten according to the current partial data.

Note that, in the third operation example, even when an Ethernet frame is fragmented over two frames, only a trailer can be added to a piece of partial data including a header among pieces of partial data. Further, an additional header may be added to a piece of partial data including a header among pieces of partial data on the outside of the piece of partial data and a trailer may be further added thereto. The data of a header for a piece of partial data including the header among pieces of partial data may be rewritten and a trailer may be added thereto. A header may be added to a piece of partial data including a trailer among pieces of partial data and an additional trailer may be added on the outside of the piece of partial data. Likewise, a header may be attached to a piece of partial data including a trailer among pieces of partial data, and the data of the trailer originally included may be rewritten according to the current partial data.

In the third embodiment, an example is presented in which a payload is added so as to have the minimum frame length not to be discarded in the Ethernet frame transmission line. However, if the value of the FCS is set as appropriate, a payload having more than the minimum frame length is allowed to be added. Note that the bandwidth efficiency deteriorates.

In the communication system 100 illustrated in FIG. 1, the bridge 30 is connected to the Trunk OLT 20. However, a Trunk ONU may be connected instead of the bridge 30. Specifically, the higher-level device 10 and a user device may be connected to each other via the Trunk OLT 20, the relay unit 61, a Trunk ONU, and the lower-level device 50. In other words, the Trunk ONU and the lower-level device 50 may be connected to each other without going through the Leaf OLT 33 and the Leaf ONU 40.

In the supplement processing, a header and a trailer may be added to all the respective fragmented partial data. In other words, even if partial data already includes a header, an additional header may be newly added to the outside of the partial data, or the header may be rewritten to the same header as the other partial data. Encapsulation in a frame with an identifiable header or rewriting to an identifiable header makes it easier to determine the necessity of defragmentation. In particular, it is effective for a configuration in which the Trunk ONU 31 and the Leaf OLT 33 are arranged as different devices (they are not arranged as separate devices unlike the configuration of the bridge 30).

Although the embodiments of the present invention have been described in detail above with reference to the drawings, the specific configuration is not limited to such embodiments, and includes any designs and the like without departing from the spirit and scope of the present invention.

INDUSTRIAL APPLICABILITY

The present invention is applicable to the implementation of a communication line having a relatively long distance.

REFERENCE SIGNS LIST

100 Communication system
10 Higher-level device
20 Trunk OLT
30 Bridge
31 Trunk ONU
32 Ethernet transmission line
33 Leaf OLT
40 Leaf ONU
50 Lower-level device
61, 62 Relay unit
70 User device
311, 331 First communication unit
312, 332 Second communication unit
313, 333 Buffer
314, 334 Storage unit
315 Control unit

The invention claimed is:

1. A communication device, comprising:
a processor; and
a storage medium having computer program instructions stored thereon, when executed by the processor, perform to:
converts, when data including partial data obtained by fragmenting a user frame and a user frame is received via a passive optical network, the partial data into data that is not discarded in a transmission line through which the user frame is transmitted, and transmits the data through the transmission line through which the user frame is transmitted; and
receives the data via the transmission line through which the user frame is transmitted, converts the received data into a user frame that is transmittable through the passive optical network, and transmits the user frame via the passive optical network.

2. The communication device according to claim 1, wherein the computer program instructions further perform to restores the user frame by combining a plurality of pieces of the partial data to convert the partial data into data that is not discarded in the transmission line through which the user frame is transmitted.

3. The communication device according to claim 2, wherein the computer program instructions further perform to buffers the user frame transmitted together with the partial data and the partial data until other partial data to be combined with the partial data is received.

4. The communication device according to claim 2, wherein the computer program instructions further perform to buffers the partial data until other partial data to be combined with the partial data is received, and transmits the user frame through the transmission line through which the user frame is transmitted, without buffering the user frame.

5. The communication device according to claim 1, wherein the computer program instructions further perform to, for data including the partial data, either supplement processing of adding data in a head part or data in an end part to be originally included in a user frame or rewriting of data in the head part or data in the end part, to convert the partial data into data that is not discarded in the transmission line through which the user frame is transmitted.

6. The communication device according to claim 5, wherein the computer program instructions further perform to receives the data subjected to the supplement processing and generates the user frame by combining a plurality of pieces of the partial data after either deleting the data in the head part or the data in the end part added in the supplement processing or writing back the data in the head part and the data in the end part rewritten in the supplement processing.

7. A communication method, comprising:
a first control step of converting, when data including partial data obtained by fragmenting a user frame and a user frame is received via a passive optical network, the partial data into data that is not discarded in a transmission line through which the user frame is transmitted, and transmitting the data through the transmission line through which the user frame is transmitted; and
a second control step of receiving the data via the transmission line through which the user frame is transmitted, converting the received data into a user frame that is transmittable through the passive optical network, and transmitting the user frame via the passive optical network.

* * * * *